A. O. TESCH.
OIL BURNER.
APPLICATION FILED FEB. 23, 1917.

1,290,683. Patented Jan. 7, 1919.

INVENTOR
Alexander O. Tesch.
By Morsell, Keeney & French
ATTORNEYS

UNITED STATES PATENT OFFICE.

ALEXANDER O. TESCH, OF MILWAUKEE, WISCONSIN.

OIL-BURNER.

1,290,683.

Specification of Letters Patent.

Patented Jan. 7, 1919.

Application filed February 23, 1917. Serial No. 150,530.

*To all whom it may concern:*

Be it known that I, ALEXANDER O. TESCH, a citizen of the United States, and resident of Milwaukee, in the county of Milwaukee and State of Wisconsin, have invented new and useful Improvements in Oil-Burners, of which the following is a description, reference being had to the accompanying drawings, which are a part of this specification.

The invention relates to heating systems.

The invention is more particularly designed to provide a burner in which the heating agent is a liquid capable of being vaporized, the vapor being generated by heat, so that the volatile element or elements of the liquid pass to the burner in the form of a gas.

The present invention is an improvement on my prior Patent No. 1,139,922 granted May 18, 1915. In this present invention I have provided a new and improved form of burner body and in connection with the device I have provided means for injecting steam or water into the volatile fluid, such as kerosene or other hydrocarbon whereby the amount of fluid fuel necessary to be fed to the burner is decreased.

If for any reason as the accidental extinguishment of the burner or the decrease in fuel from the supply tank the burner should go out and thus cool down I have provided a thermostatically operated safety valve which automatically shuts off the supply of fuel to the burner when the same cools down.

The invention is further designed to provide a new and improved form of burner.

The invention further consists in the several features hereinafter set forth and more particularly defined by claims at the conclusion hereof.

In the drawings Figure 1 is a plan view of the device embodying the invention;

Figure 1:
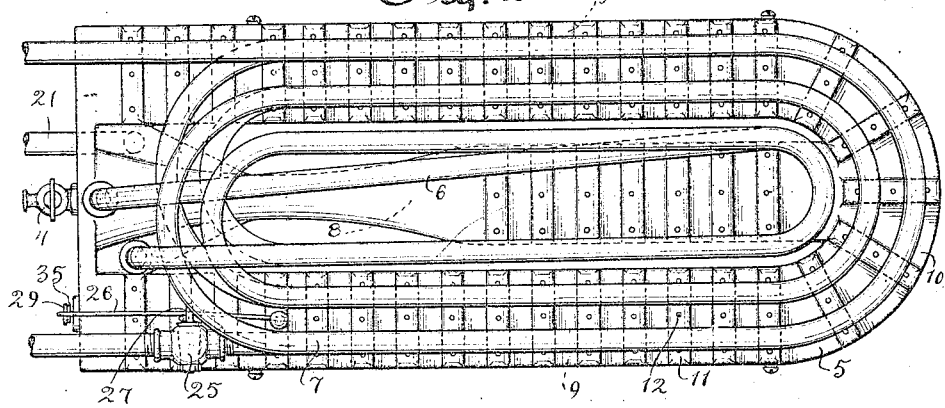
Figure 2:
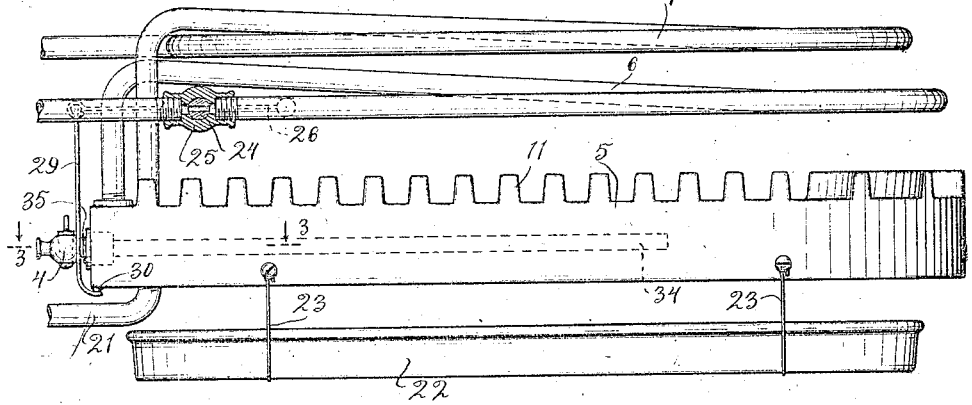
Fig. 2 is a side elevation thereof.
Figure 3:
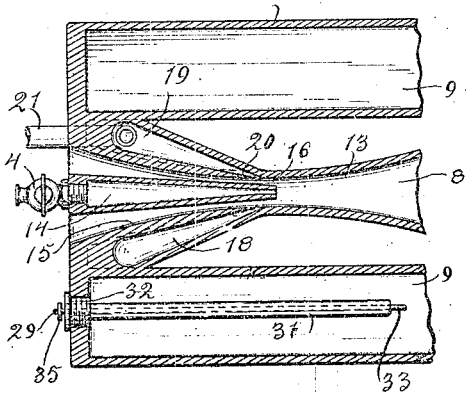
Fig. 3 is a section taken on the line 3—3 of Fig. 2.
Figure 4:
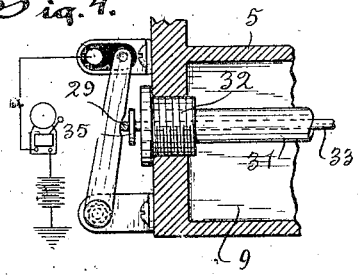
Fig. 4 is a detail sectional view showing the alarm connected up to the safety valve control.

In general the device comprises a burner body 5, means for supplying air to said body, means for supplying fuel to said body, a vaporizing coil 6, a steam or water coil 7, means for initially heating the burner, a safety valve for shutting off the supply of fuel to the burner and means for operating said valve, together with the connections, hereinafter described, between the various parts of the device.

The burner body 5 consists of a casting having a central conduit 8 and side conduits 9 meeting each other and the central conduit at their curved outer end 10. The upper portions of the burner above the conduits are provided with transversely extending burner sections 11 projecting upwardly from the main body of the heater and provided with a plurality of burner apertures 12 leading to the conduits. The inlet end 13 of the conduit 8 is formed to provide a conduit of gradually increasing capacity in the direction of flow of the fuel to thereby decrease the velocity of flow of the fuel and permit it to expand in the conduits. The fuel is supplied to the burner through a nozzle 14 of gradually decreasing capacity in the direction of flow the end of the nozzle entering the conduit 8 at the contracted or throat portion 16 of the end 13 whereby the fuel is efficiently introduced into the burner. A pet cock 4 permits of draining the burner of its contents.

The means for supplying air to the fuel comprises an inlet 15 of gradually decreasing capacity in the direction of flow communicating with the inlet end 13 of the conduit 8 and forming with it a Venturi tube in which the outlet end of the nozzle 14 is centrally positioned in the throat 16 thereof whereby the velocity of air past the throat is increased creating a suction of fuel into the conduit 8 and an efficient mixture therewith.

In case the burner is used with the heavier hydrocarbon fuels, such as kerosene, it is necessary to initially vaporize the fuel and this is done by conducting the fuel from its source of supply into a vaporizing coil 6 disposed above the burner and heated thereby and leading down into the expanded portion of the nozzle 14.

In order to save fuel I have found that by injecting or mixing steam or water therewith that an efficient heating mixture is obtained and I therefore conduct water from a suitable source of supply into a coil 7 disposed above the burner heads and heated thereby and leading down into the rear end of a nozzle 18 in the burner body with its contracted outlet leading into the throat 16 whereby the vaporized fuel is mixed with the steam. The entrance of the steam or water to the heater is controlled by any suitable valve (not shown), the valve not being opened until the water in the coil has reached the desired temperature.

The means for initially heating the burner may be of various kinds and in the present instance I have shown a nozzle 19 in the burner body having its contracted outlet end 20 leading into the throat 16, said nozzle being connected by a pipe 21 to any suitable coal gas supply pipe (not shown). Where coal gas is not available the burner may be initially heated by lighting a body of hydrocarbon fuel in a pan 22 removably mounted on bails 23 depending from the burner.

The safety valve comprises a one-way valve member 24 rotatably mounted in a coupling 25 in the pipe of the vaporizing coil, the valve being set to be normally open. When for any reason the burner goes out the valve is automatically closed by the release of a member 26 carried by the handle 27 of the valve and having a weighted end and normally held in inoperative position by a hook 29 pivotally secured to the other end of the member 26 and engaging a projection 30 on the base of the burner. The operation of the valve is thermostatically controlled by using two members of dissimilar coefficients of expansion, one of said members being movable against the hook 29 to disengage it and allow the weighted member 26 to close the valve. In the present instance I have shown a thermostatic control consisting of a copper tube 31 disposed in one of the side conduits 9 and secured therein by a plug 32. An iron rod 33 is fixedly secured at its inner end 34 to the tube 31 and extends through the tube and is slidably mounted in the plug 32, its outer end carrying a button 35 which abuts against the hook 29. With this construction when the burner goes out and cools down the more rapid contraction of the copper tube 31 moves the rod 33 outwardly against the hook 29 disengaging it and allowing the weighted member to close the valve thus stopping the feed of fuel.

In operation the burner is initially heated by turning on the coal gas supply and lighting the burner or by lighting a supply of fuel within the pan 22 thus heating the vaporizing coil 6 and the steam or water coil 7 which are then turned on and the mixture of hydrocarbon fuel, air, and steam or water are fed through the inlet to the conduits 8 and 9 and pass to the burner head where the heat is also used to heat the vaporizing and steam coils. The burner may be used in connection with any suitable heating system for steam, hot water or hot air and in case the burner goes out the safety valve will operate as previously described.

I am aware that the details of construction herein shown and described are capable of some modification and change, but any such structures as come within the scope of the appended claims I deem to be within the spirit of my invention.

What I claim as my invention is:

1. In an oil burner, the combination, with a burner body including a conduit and burner heads communicating therewith, of a Venturi tube at the inlet to said conduit for admitting air thereto, a fuel supply nozzle projecting into said tube and having its outlet disposed at the throat portion thereof, a vaporizing coil disposed above the burner heads and connected to said nozzle, a fluid supply nozzle communicating with said tube at the throat portion thereof, a fluid coil disposed above the burner heads and connected to said fluid nozzle, and means for initially heating the burner.

2. In an oil burner, the combination, with a burner body including a conduit and burner heads communicating therewith, a Venturi tube at the inlet to said conduit for admitting air thereto, a fuel supply nozzle projecting into said tube and having its outlet disposed at the throat portion thereof, a vaporizing coil disposed above the burner and connected to said nozzle, an aqueous and connected to said nozzle, an aqueous fluid supply nozzle communicating with said tube at the throat portion thereof, a fluid coil disposed above the burner and connected to said fluid nozzle, means for initially heating the burner, and means for automatically shutting off the supply of fuel to the burner heads.

3. In an oil burner, the combination, with burner heads and a supply conduit communicating therewith, of a Venturi tube at the inlet to said conduit for supplying air thereto, a fuel supply nozzle having its outlet disposed in the throat of said tube, a vaporizing coil disposed above the burner heads and connected to said nozzle, an aqueous fluid supply nozzle having its outlet disposed in the throat of said tube, and means for initially heating the burner including a gas nozzle having its outlet disposed in the throat of said tube.

In testimony whereof, I affix my signature.

ALEXANDER O. TESCH.